(12) United States Patent
Dolk

(10) Patent No.: US 8,876,113 B2
(45) Date of Patent: Nov. 4, 2014

(54) STRATEGY, AND TRAINING GAME AND METHOD FOR ENHANCING MEMORIZATION AND DECISION MAKING

(71) Applicant: The John Marshall Law School Patent Clinic, Chicago, IL (US)

(72) Inventor: Brian T. Dolk, Germantown, WI (US)

( * ) Notice: Subject to any disclaimer, the term of this patent is extended or adjusted under 35 U.S.C. 154(b) by 0 days.

(21) Appl. No.: 13/837,225

(22) Filed: Mar. 15, 2013

(65) Prior Publication Data

US 2014/0084539 A1    Mar. 27, 2014

(51) Int. Cl.
*A63F 3/00* (2006.01)

(52) U.S. Cl.
USPC .......................................... 273/260; 273/288

(58) Field of Classification Search
USPC ......................................... 273/260, 261, 288
See application file for complete search history.

(56) References Cited

U.S. PATENT DOCUMENTS

| | | | |
|---|---|---|---|
| 1,472,657 A | 10/1923 | William | |
| 2,984,914 A | 5/1961 | Feigen | |
| 3,353,829 A | 11/1967 | Board | |
| 3,588,114 A * | 6/1971 | Vogel | 273/260 |
| 3,779,554 A | 12/1973 | Brix | |
| 3,881,731 A | 5/1975 | Droney | |
| 3,917,272 A * | 11/1975 | Aldea | 273/260 |
| 4,093,236 A | 6/1978 | Hoffa | |
| 4,159,117 A * | 6/1979 | Kuna | 273/243 |
| 4,161,315 A * | 7/1979 | Walton | 273/262 |
| 4,188,035 A * | 2/1980 | Metzler, Jr. | 273/260 |
| 4,188,036 A * | 2/1980 | Jones-Fenleigh | 273/265 |
| 4,299,389 A | 11/1981 | Miolo | |
| 4,309,036 A | 1/1982 | Alvey | |
| 4,570,938 A * | 2/1986 | Ferris et al. | 273/243 |
| 4,805,915 A | 2/1989 | Lamle | |
| 5,244,212 A | 9/1993 | Bendit | |
| 5,314,189 A * | 5/1994 | Kerivan | 273/260 |
| 5,388,837 A | 2/1995 | Hoffman | |
| 5,484,157 A | 1/1996 | King | |
| 5,692,754 A | 12/1997 | Rostami | |
| 5,839,727 A | 11/1998 | Stillinger | |
| 5,957,455 A * | 9/1999 | Aldridge | 273/260 |
| 6,106,395 A | 8/2000 | Begis | |
| 6,446,966 B1 | 9/2002 | Crozier | |
| 6,981,700 B2 | 1/2006 | Syed et al. | |
| 7,017,906 B1 | 3/2006 | Benjamin | |

(Continued)

FOREIGN PATENT DOCUMENTS

WO    WO 02065410 A2 *    8/2002

*Primary Examiner* — Vishu K. Mendiratta
(74) *Attorney, Agent, or Firm* — The John Marshall Law School Patent Clinic; Vangelis Economou

(57) ABSTRACT

A chess variant strategy game enhancing decision-making skills and memorization comprises most pieces being concealed within housing shells, except for the King, so that players must identify and memorize the opponent's game pieces from their movements. The use of at least one "hold and secure" placeholder on a square allows a player to "hold and secure" squares upon capturing an opponent's piece on that square and more realistically emulates battle situations. A method for training comprising plural training phases, including increasingly complex rules variations, all of which have game pieces concealed within housing shells and the "hold and secure" feature, and some or all pieces starting in non-traditional chess starting positions. The phases are customizable with different variations and may include time constraints, variable piece starting positions and alternative goals, as well as other features that alter the conditions and parameters of play.

17 Claims, 7 Drawing Sheets

(56) References Cited

U.S. PATENT DOCUMENTS

| | | |
|---|---|---|
| 7,017,907 B2 | 3/2006 | Labetti |
| 7,118,109 B2 | 10/2006 | Labetti |
| 7,410,418 B2 | 8/2008 | Potter |
| 7,749,058 B2 | 7/2010 | Kershaw |
| 8,070,164 B1 * | 12/2011 | Gaehring .................. 273/273 |
| 2002/0109298 A1 * | 8/2002 | Zaruba et al. ............. 273/292 |
| 2005/0093237 A1 * | 5/2005 | Bowling .................... 273/255 |
| 2005/0230915 A1 | 10/2005 | Alvarez |
| 2009/0206548 A1 | 8/2009 | Hawkins et al. |

* cited by examiner

STRATEGY, AND TRAINING GAME AND METHOD FOR ENHANCING MEMORIZATION AND DECISION MAKING

BACKGROUND OF THE INVENTION

1. Field of the Invention

The present invention relates to a strategy game to improve a person's critical decision-making skill set and enhance memorization especially for training in contested endeavors. More particularly, the present invention uses the basics of traditional chess while expanding upon traditional chess rules so that the players improve decision-making skills and build memorization capability for purposes of training.

2. Background Art

For centuries leaders have become familiar with traditional chess because of the intellectual challenges of analytical thinking and strategy that are relied on throughout the match. In traditional chess, each opponent operates with complete knowledge of where all the pieces are on the chessboard. Indeed, one challenge that chess has in representing the chess game as the real world is that there is no information uncertainty. Thus, chess simply does not reflect the realities in business, military or other contested endeavors.

Traditional chess has standardized rules that are internationally recognized, and have been standard for such a long period that almost all persons who play the game cannot differ on the rules therefor. Also, notation of traditional chess matches is a language unto itself. Traditional chess gained in popularity over the last few centuries because of this common knowledge and consistency. From the standpoint of continuity, consistency has served players of chess well, especially with respect to international competition.

Whether in business, the military, or other contested endeavors, knowing 100% of your opponent's assets is ideal, but in most contested endeavors, incomplete information must be used for decision making. The received information is often less than 100% accurate and based on outdated or ever-changing data. The ability for the decision maker to have complete real-time knowledge of their opponents' position requires extensive reconnaissance, surveillance methods, and clandestine operations, all of which are time-consuming and expensive.

Although researchers believe that through studying chess, a better understanding of competition will result, they have also realized that chess does not accurately depict real world environments. Additionally, the benefits from playing the game of chess can plateau when viewed from the standpoint of real life situation or representation, and becomes an esoteric exercise in chess moves, strategy and other arcana not directly useful in real world situations. Similar to physical training, the mind must also be continuously challenged or the intellectual horsepower starts to deteriorate. In an effort to add the component of uncertainty and to increase the benefits from playing chess, many variations of chess have been developed.

One such variation is stealth chess. Stealth chess is more similar to the board game "Stratego" than it is to chess. Stealth chess deviates from the rules of chess in that you do not "check" or "checkmate" your opponent, and no one has visibility of the opponent's pieces on the board.

In another variation described in U.S. Pat. No. 3,779,554, chess pieces are placed at starting positions other than predetermined traditional locations. The contraption is bulky. A mirror exposes the pieces as they cross over a demarcation line so the participant does not need to memorize or recall the pieces anymore when in the player's area, but will lose observationability once the pieces, either one's own or the other players, enters the other player's area.

In U.S. Pat. No. 7,410,418, the concealed chess game can only be played on a computer network. Information on some of pieces on the squares is disclosed, but this information excludes positions and types of game pieces on other squares. There is a lack of any physical contact or non-screen or digital exposure to the board or the pieces.

In U.S. Pat. No. 4,093,236, a tactical game is taught that uses the board's terrain to restrain movement and firepower of the chess pieces.

In yet another variation, U.S. Pat. No. 5,484,157 teaches military pieces replacing the traditional chess pieces, new pieces are added, and the restrictions of the pieces are a departure from traditional restrictions and play.

U.S. Pat. No. 5,388,837 teaches a game of military strategy with pieces that have a status power given randomly by a dial, and this affects the movements and strength of the pieces.

What is not disclosed or taught by the heretofore known chess variations is a more realistic battlefield or business environment simulation. The present invention comprises the same basic tenets of traditional chess with chess pieces starting out on a squared checker board, either with a traditional or non-traditional initial placement.

SUMMARY OF THE INVENTION

Taking into account the desire to simulate as much as possible real life situations than is known in the heretofore variants of chess, what is disclosed and claimed is a chess game variant in which all the chess pieces, except for the King, are placed inside shells to obscure them from the opponent's view. Additionally, there is the feature in which a player can "hold & secure" up to two squares in a match upon capturing an opponent's piece to block the opponent's pieces from occupying or traversing therethrough. Additionally, disclosed herein is a method for training that contains phases that comprise different chess variants, including the "hold and secure" feature, in addition to some pieces being concealed in a housing shell.

The invention also comprises a training method that is increasingly more complex in the rules so that as proficiency is achieved in one phase, additional phases are launched that are more challenging and exercise mental capabilities more intensely to eventually lead to improvement therein.

Accordingly, it is a clear improvement and distinct advantage of the present invention to provide a strategy game adapted to enhance a player's skill in decision making and memorization. The present invention uses traditional chess pieces but advances the game to a different level that requires different skills to perform well. The inventive game and training method is customizable with different options. For example, under normal play, the chess pieces are enclosed within shells, but in one variation, one side can remove the chess pieces from the shells so that one side has complete information of their opponent and the other side has incomplete information. Other variations include time constraints, variable starting positions for some or all pieces, alternative goals (i.e. the object requires capture of both Rooks & King for victory), and a reversal of the rules where the shelled pieces from either participant are obscured, such that in addition to or in lieu of having to recall your opponent's pieces, you must recall where your pieces are and having to use memory to recall your pieces if they are obscured from your view. The invention, however, is not limited to these variations and may have these features, as well as others that may be developed in the future, such as an electronic version in which the game is played and the training program is done on a computer system. It is a feature of the invention, however, that the use of tactile real life elements and physical shells and pieces is preferable, as this is considered to provide much better memory and strategic training and a greater real-life experience.

For beginners, it is necessary to first learn the basic game of chess so that the beginner can play the present invention. The training method comprises an initial stage in which the player learns to play chess on a substantially horizontal playing surface containing a plurality of checkered squares and a plurality of game pieces having playing characteristics identical to game pieces used in playing traditional chess. Once this stage is achieved, the player enters Phase 1, in which most game pieces are concealed within a housing shell, one side of the housing shell revealing the game piece facing the first side of the playing surface (a player's viewpoint) and the other side of the housing shell being opaque such that the game piece is not viewable from the second side of the playing surface, i.e., from the opponent's viewpoint.

Once the player is proficient in Phase 1, the player moves to Phase 2. In Phase 2, each player may move each game piece containing the concealed game piece according to traditional chess game rules and rules of Phase 1. Additionally, in Phase 2, a player who has captured a game piece can choose to insert a placeholder at the location on the captured square to "hold and secure" the square, wherein the captured square can no longer be used by the opposing player to pass through or land, unless recaptured. In one embodiment of the invention, once a player reaches proficiency in Phase 2, the player moves to Phase 3, wherein the third phase variation comprises a player being given two missions to complete before capturing the King and, optionally, a time element may be added.

In yet another variation of the invention, the strategy game provides for the captured square but its use is restricted to the opposing player for a predetermined number of plays and then the captured square becomes available again. Also, restrictions may be placed on the number of squares that can be held as captured square.

Still another feature of the invention is a plurality of game pieces having playing characteristics identical to game pieces used in playing traditional chess with each game piece being concealed within a housing shell except for the King. The housing shell for concealing each of the game pieces comprises one side which reveals the game piece disposed inside that shell wherein an opening in the shell faces the first side of the playing surface and the other side of the housing is opaque such that the game piece disposed inside that shell is not viewable from the second side of the playing surface (generally, the opponent's view). The housing shell comprises a base that is smaller in surface area than the width dimensions checkered square so that each base can be accommodated within a square, and the base has one wall extending vertically from the base to a top cap, an interior platform extending essentially horizontally disposed at the top of the base, and the wall containing an opaque wall that essentially encloses on at least three sides the area of the interior platform, wherein the device is capable of concealing the playing piece disposed on the platform within the enclosure of the opaque wall so that it is not visible from the direction of the opposing second side and the top conceals game piece from the top view.

Still another feature of the invention is a strategy game wherein game pieces are placed on the horizontal playing surface not following traditional chess game arrangements. For example, the pieces may be placed in different spots according to the desires of the player, or alternatively they may be randomly placed by the opposing player who does not know which pieces are in the concealed enclosure. This embodiment also includes the feature of concealing the game piece within the enclosure of the opaque wall so that the piece is not visible to the opponent. Game pieces move according to traditional chess rules, and players must figure out the identity of the game pieces based on their movements and must remember which pieces are on which square. The feature in which a player who has captured a game piece can choose to have a placeholder remain on a captured square, wherein the captured square can no longer be used by the opposing player to pass through or land, unless recaptured may also be included.

BRIEF DESCRIPTION OF THE DRAWINGS

The preferred embodiments of this invention herein have been described and illustrated with reference to the embodiments of FIGS. 1-16, but it should be understood that the features and operation of the invention as described is susceptible to modification and alteration without departing significantly from the spirit of the invention. For example, the dimensions, size and shape of the various elements may be altered to fit specific applications, or additional steps or phases may be included in the training methods. Accordingly, the specific embodiments illustrated and described herein are for illustrative purposes.

Although the invention is generally described in the context of these preferred embodiments, it should be understood that it is not intended to be limited to only these particular embodiments. Certain elements in selected ones of the drawings may be illustrated not-to-scale, for illustrative clarity.

Figure 1:
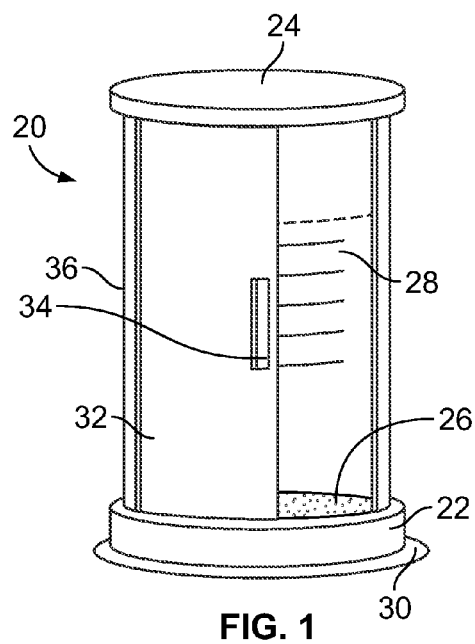
Figure 2:
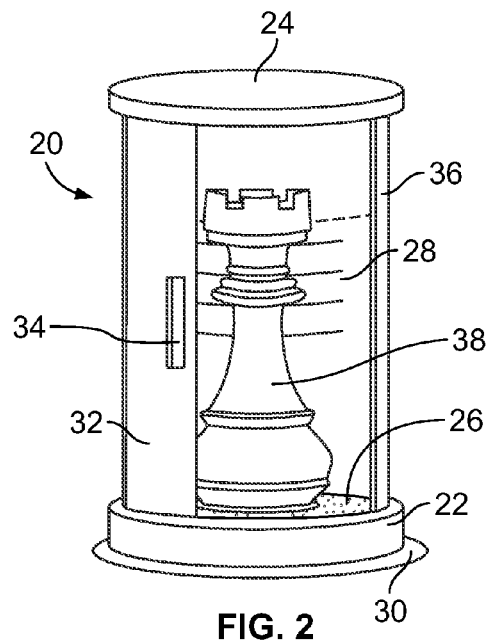
Figure 3:
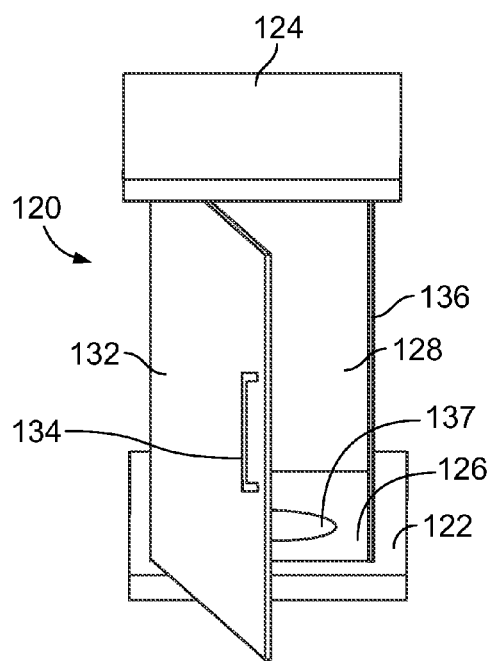
Figure 4:
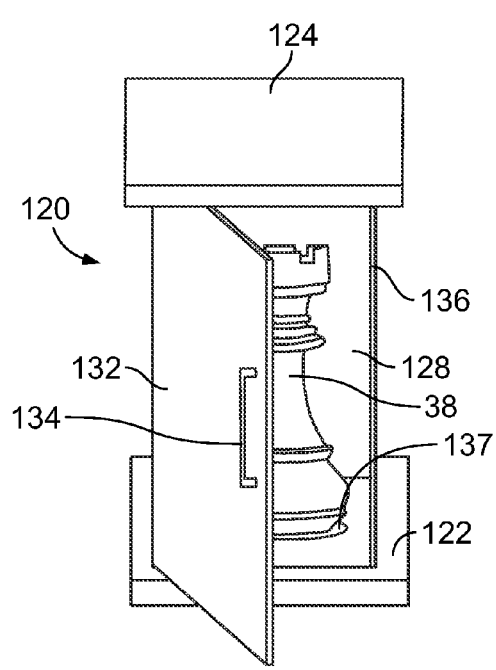
Figure 5:
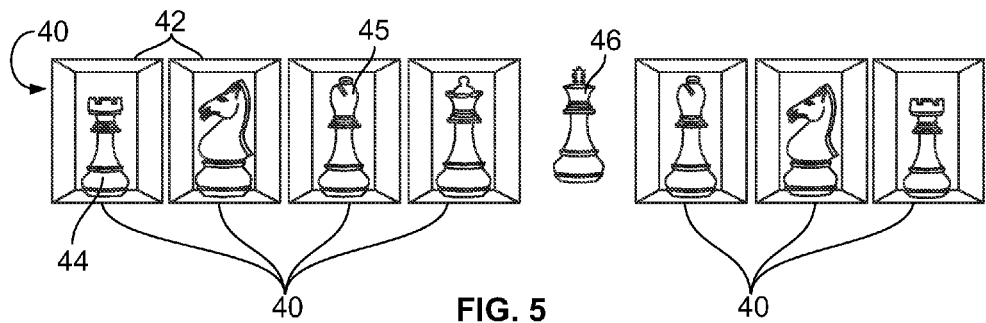
Figure 6:
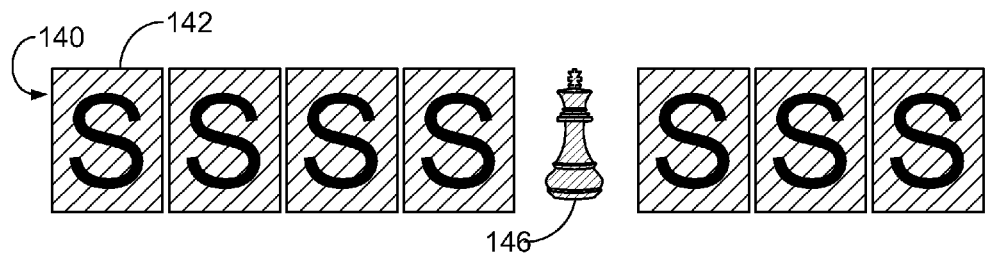
Figure 7:
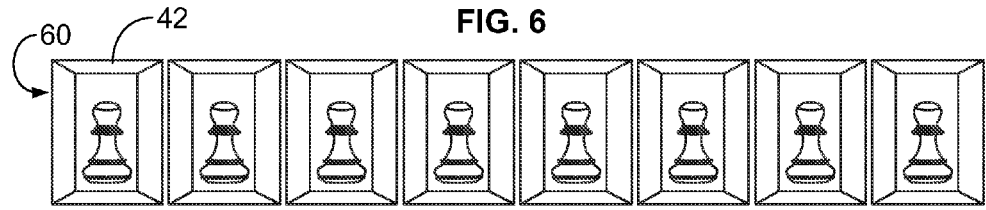
Figure 8:
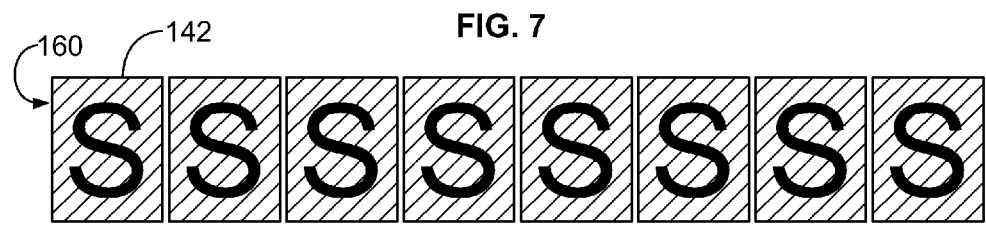
Figure 9:
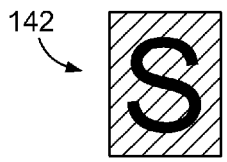
Figure 10:
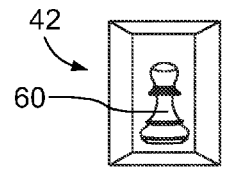
Figure 11:
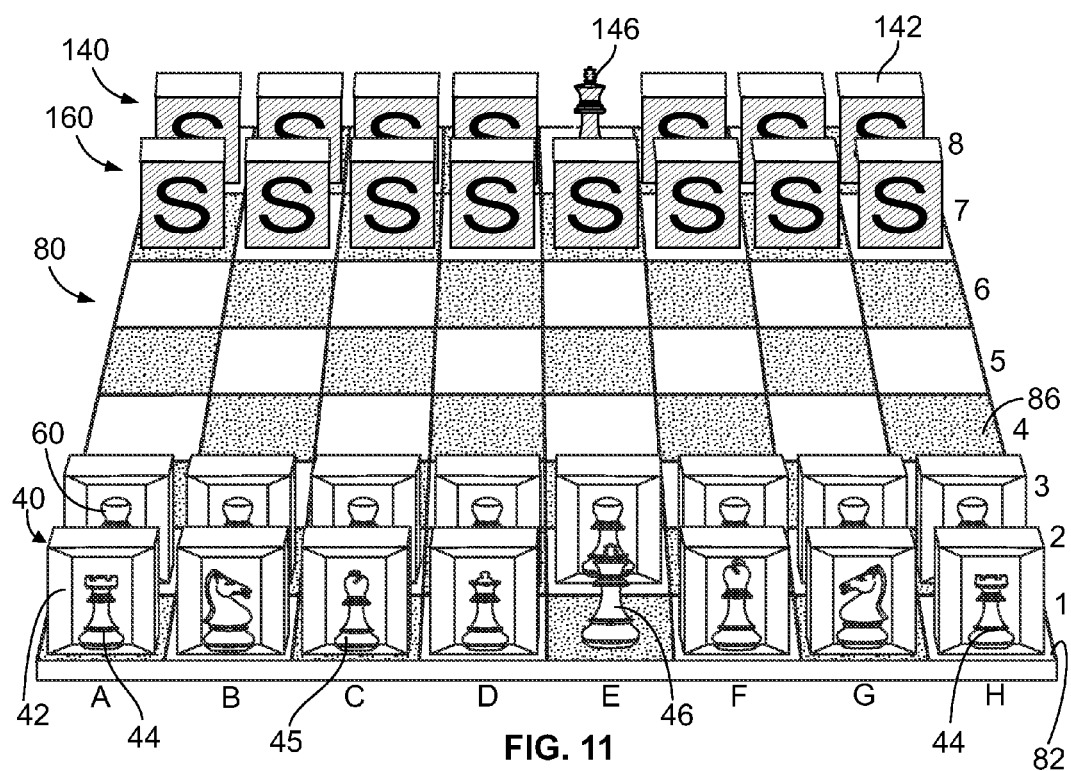
Figure 12:
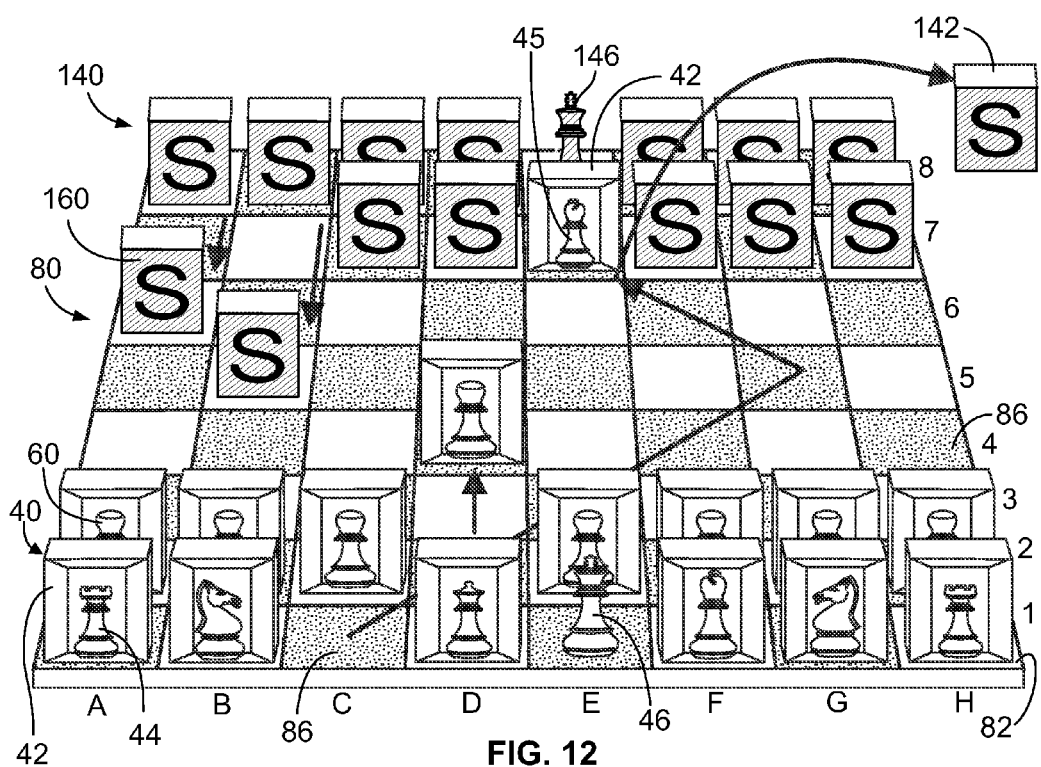
Figure 13:
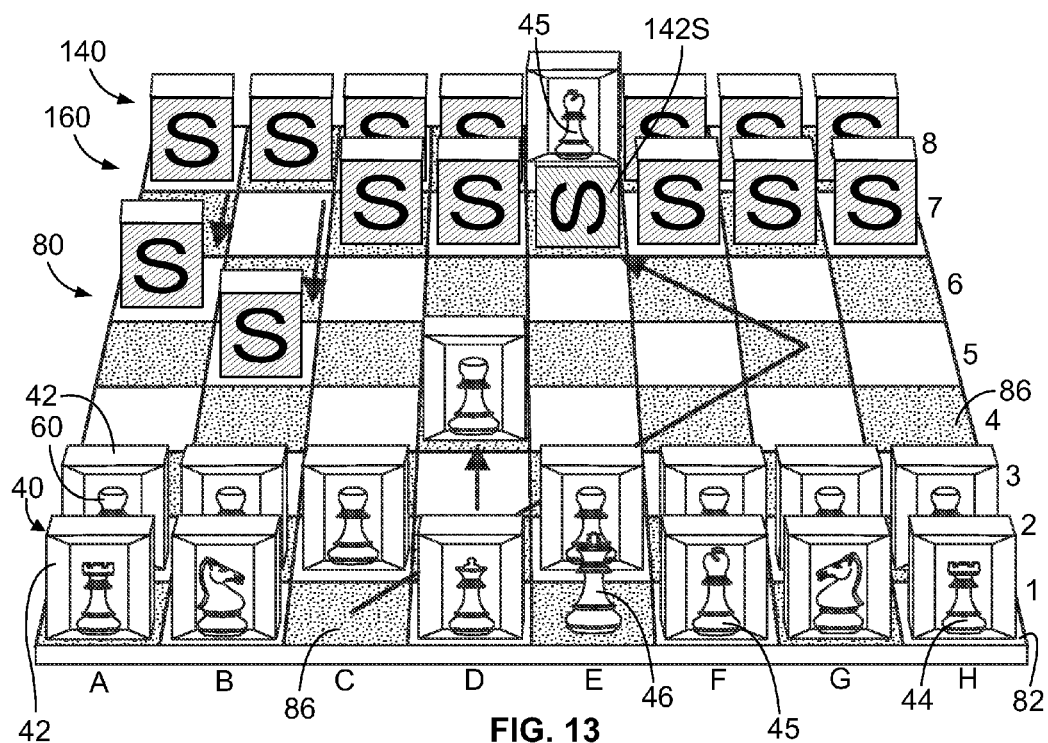
Figure 14:
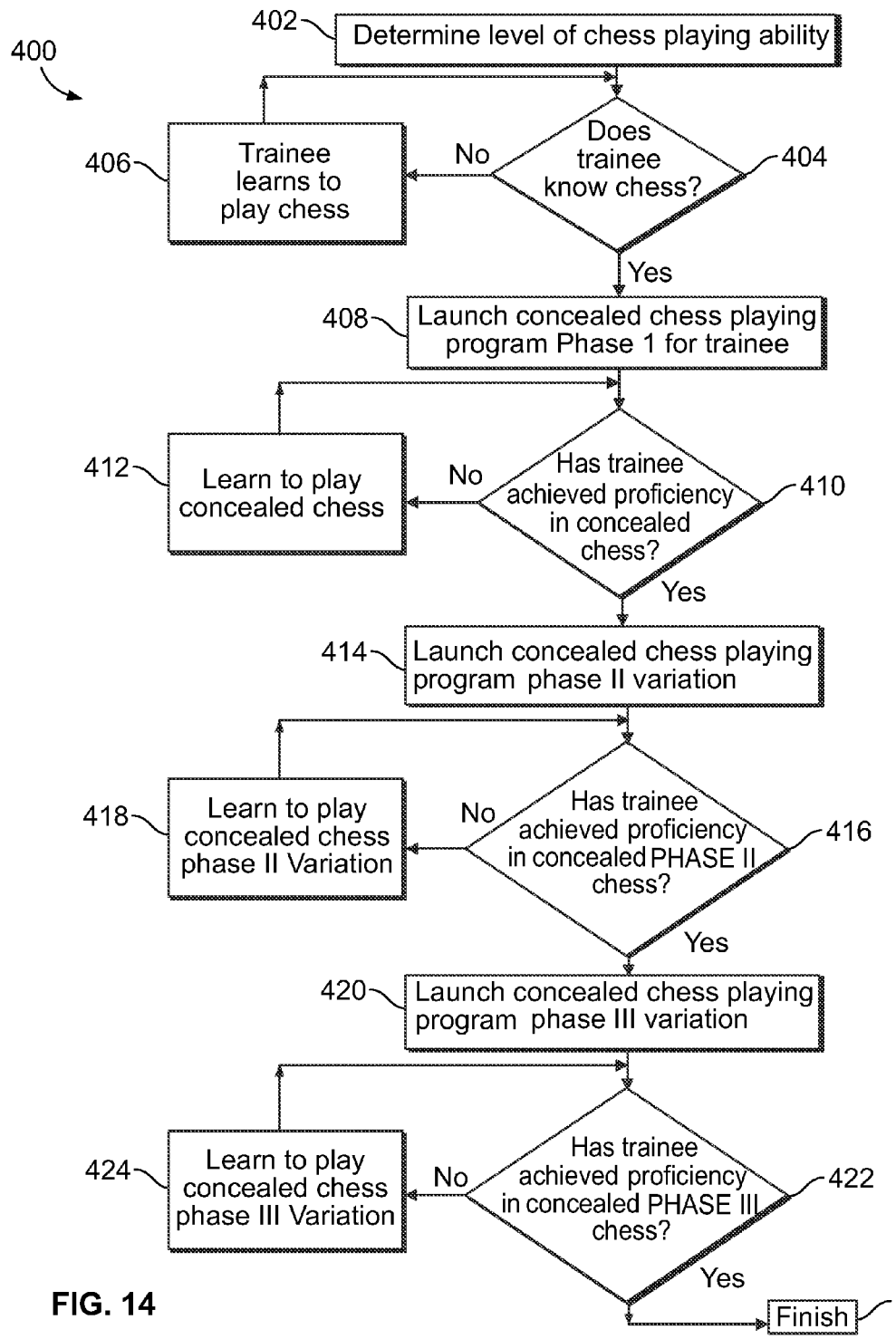
Figure 15:
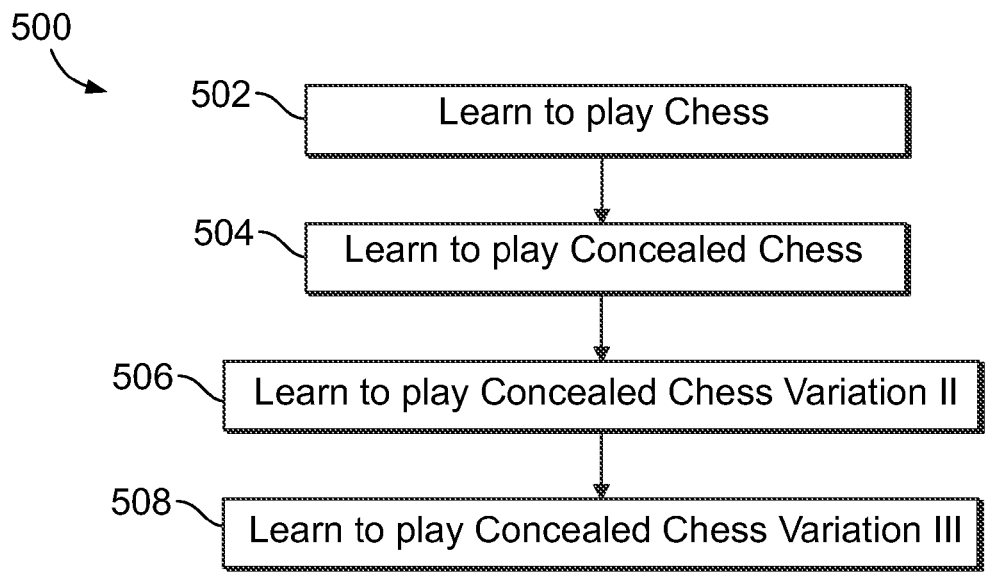
Figure 16:
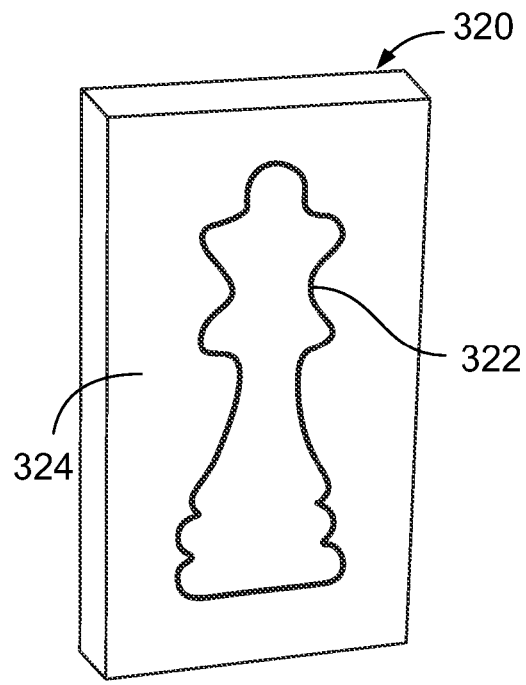

The structure, operation, and advantages of the present preferred embodiments of the invention will become further apparent upon consideration of the following description taken in conjunction with the accompanying drawings, wherein:

FIG. 1 is an isometric view of the game shell;

FIG. 2 is an isometric front view of the game shell of FIG. 1 containing a game piece;

FIG. 3 is an isometric front view of the other embodiment of the game shell;

FIG. 4 is an isometric front view of another embodiment of a game shell shown in FIG. 3 containing a game piece;

FIG. 5 is a side view from a player of the white game pieces of the first row/rank (power game pieces) contained within white game shells except for the King;

FIG. 6 is a side view of black game pieces of the first row/rank (power game pieces) contained within game shells except for the black King from the viewpoint of a white player viewing opponent's black pieces;

FIG. 7 is a side view from a player of the white game pieces of the second row/rank (pawns) contained within white game shells;

FIG. 8 is a side view of black game pieces of the second row/rank (pawns) contained within black game shells from the viewpoint of a white player viewing opponent's pieces;

FIG. 9 is a side view from an opponent's view where the side is opaque concealing the identity of the game piece inside the game shell;

FIG. 10 is a side view from a player's view of the player's own pieces, where the side is open showing the identity of the game piece (pawn) inside the game shell;

FIG. 11 is a perspective view from the player of the white game pieces of the board;

FIG. 12 is a perspective view from the player of the white game pieces of the board showing a move providing for the "hold and secure" feature of a black game piece on a board square;

FIG. 13 is a perspective view from the player of the white game pieces of the board showing a "hold and secure" of a black game piece FIG. 14 is a flowchart of the present invention's training method;

FIG. 15 is a simplified flowchart of the present invention's training method; and FIG. 16 is an isometric view of an alternative white game piece.

DETAILED DESCRIPTION OF THE PREFERRED EMBODIMENTS

The following description is of a chess-like game utilizing variations of chess as disclosed and claimed herein. Although the game is described relative to traditional chess, it is obvious to a person of ordinary skill in the art that these modifications of the game may take many variants of chess, and as many as are appropriate to provide for the training method disclosed and claimed herein are considered to be a part of the invention. The chess-like game involves concealed game pieces and the players play chess without complete information of their opponent's position.

The game includes covers for the pieces, hereinafter referred to as shells, and once the game pieces are disposed in the shells, the game pieces are concealed from view of the opponent. All of the chess pieces, except for the King, and optionally other pieces, are placed inside the shells. The same basic tenets of traditional chess and rules thereof remain in effect. Preferably, at least for the earlier phases of the training, all of the chess pieces start out in the traditional places on a 64 square board.

The equipment for this game is a horizontal playing surface with a plurality of checkered squares, traditionally 64, and 32 chess pieces, comprising two separate colored sides (white, black), of which each side has 8 Pawns, 8 power pieces made up of 2 Rooks, 2 Bishops, 2 Knights, 1 Queen, and 1 King. In the preferred embodiment, each side disposes 15 shells 20 comprised of two separate colors one light and one dark (white, black) in which all of the Pawns are housed within the shells 20 and all of the power pieces, except for the King, are also housed within the shells 20.

FIG. 1 shows in detail one embodiment of the housing shell 20, and FIG. 2 shows the game piece 38 disposed inside the housing shell 20 from the viewpoint of the player looking at the player's own pieces, thus making the pieces visible to only the player who is playing those pieces. The function of housing shell 20 is to conceal each of the game pieces 38, with the exception of the King. One side of the housing shell 20 reveals the game piece 38 disposed inside that shell 20 in the direction of the player whose pieces are in shell 20. Preferably, an opening in the shell 20 faces the first side of the playing surface and the other side of the housing is opaque, so that the game piece 38 disposed inside that shell 20 is not viewable from the second side of the playing surface, that is, from the opposing player's viewpoint.

The housing shell 20 further comprises a base 22 and bottom 30 that supports the game piece 38 on the horizontal playing surface, and a predetermined game piece, usually the King, of the game pieces being visible to all players. The housing shell 20 has a bottom 30 that is smaller in surface area than the checkered square (as shown in FIG. 11). The base 22 has at least one wall 36 extending essentially vertically from base 22 to an optional top cap 24 and an interior platform 26 extending essentially horizontally disposed above base 26. The wall 36 contains an opaque material and essentially encloses on at least three sides the area of the interior platform 26. In this way the device is capable of concealing the playing piece 38 within the interior 28 of the opaque wall 36 so that it is not visible from the direction of the opposing second side and the top cap 24 conceals game piece 38 from the top. The wall 36 optionally contains a door 32 that is retractable into an open position so as the door 32 renders the playing game piece 38 visible inside the shell 20 when door 32 is in open position and invisible to all in the closed position.

The door 32 can be opened and closed using a handle 34. In FIG. 1 and FIG. 2, the wall 36 and the door 32 are both circular, and the door 32 slides along the wall 36. The top 24 can be used to place checker game pieces on as well.

FIG. 3 illustrates an alternative embodiment shell 120. FIG. 4 shows the game piece 38 located inside the shell 120 from the viewpoint of player looking at the player's own pieces. The housing shell 120 comprises a base 122 that supports the game piece 38 on the horizontal playing surface 126, and a predetermined game piece, usually the King 46, of the game pieces being visible to all players.

The housing shell 120 has a base 122 that is smaller in surface area than the checkered square (as shown in FIG. 11). The base 122 has at least one wall 136 extending vertically upward from base 122 to a top cap 124 and an interior platform 126 extending essentially horizontally disposed at the top of the base 126. The wall contains an opaque wall 136 that essentially encloses on at least three sides the area of the interior platform 126, wherein the device is capable of concealing the playing piece 38 within the interior 128 of the opaque wall 136 so that it is not visible from the direction of the opposing second side. The top cap 124 conceals game piece 38 from the top.

The wall 136 contains a door 132 that slides into an open position, and the playing game piece 38 inside the shell 120 is viewable to one side when door 132 is in open position. The door 132 can be opened and closed using an optional handle 134. The interior platform 126 has a means of temporary attachment 137, such as a magnet or hook attachment, such as Velcro®, for attaching the game piece 38 to the interior platform 126. Of course, the game piece 38 should include a corresponding attachment mechanism, such as an oppositely oriented magnet or hook and loop fastener (Velcro®) strip to attach to the temporary attachment 137. The attachment is temporary, because it may be necessary to remove the piece from inside the enclosure of the shell 120, for example, to clean the shell 120, or to use the piece 38 outside of the shell 120.

Referring now to FIG. 11, the initial set-up of the game is such that the horizontal playing surface, such as chess board 80 having a plurality of checkered squares 86, is positioned where a light colored square 82 is disposed in the bottom right hand corner for each participant. The game pieces 40, 60, in the shells 20, 120 (FIGS. 1-4), or alternatively 42 (FIGS. 11-12) or alternatively as in the block pieces 320 (FIG. 16). are set up on the board first. On the board there are 8 horizontal rows (also called ranks), 8 vertical columns (also called files), and diagonal lines disposed on the board having the same light or dark color on the checker board (also called diagonals).

For a traditional setup, on the second rank, the participant places all of the Pawns 60, 160 inside the shells 42, 142 along the entire rank. On the first rank, the participant with the white pieces places all of the power pieces 40, inside the shells 42, except for the King 46, and places them in the following order from left to right: Rook 44, Knight, Bishop 45, Queen, King 46, Bishop 45, Knight, and Rook 44. The black game pieces are set up identical to that of the white game pieces, except that the opposing Kings and Queens are in the same files E and D respectively. Although a rectangular game shell 120, a cylindrical game shell 20 and a box type game shell 42 are illustrated in FIGS. 1-4 and 10, the invention is not limited to these specific game shells. Alternative embodiments, for example, such as the block pieces 320 with the figure of the chess pieces 322 drawn into one side of an upstanding wall 324, as shown in FIG. 16, of the game shells will become apparent to a person of ordinary skill following understanding of the concealment characteristics of the embodiments that are illustrated.

Referring now to FIG. 5, white game pieces 40 of the first row (first rank) contained within white game shells 42 except for the King 46 from the viewpoint of the white player viewing player's own pieces 40. The white game piece designated as the Rook 44 is contained within the white shell 42 as is the piece designated as the bishop 45. FIG. 6 shows the shells 142 enclosing black game pieces, the power pieces group designated as 140, of the first row (first rank) contained within black game shells 142 except for the King 146. From the viewpoint of a player playing the black pieces viewing the opponent's or white player's pieces 140, only white shells 42 and the white King 46 can be seen. Similarly, from the viewpoint of the player playing the white pieces, only the black shells 142 and the black King 146 can be seen.

FIG. 7 shows the white game pieces of the second row (second rank), Pawns 60, contained within white game shells 42 from the viewpoint of the white player viewing that player's own pieces 60. FIG. 8 shows black game pieces of the second row (second rank), Pawns 160, contained within black game shells 142 from the viewpoint of a white player viewing opponent's or black player's pieces 160. Only black shells 142 can be seen.

FIG. 9 shows an opponent's view where the side is opaque concealing the identity of the game piece inside the game shell 142. FIG. 10 shows a player's view of that player's own pieces, where the side of the shell 42 is open showing the identity of the game piece 60 (Pawn) inside the game shell 42.

FIG. 11 shows the board 80 from the white game pieces player's viewpoint. From this viewpoint, only the white game pieces contained within the white shells 42 are identifiable and the opponent's or black player's King 146 is the only one of the opponent's pieces that is known to the white player.

The match starts with the participant who is playing the white pieces in the white shells 42 moving the first game piece within the shell. Only one piece is moved on each turn except when a participant makes a move called castling. Participants can only make one move per turn and may not pass a turn. Each chess game piece moves according to the traditional rules of chess and is allowed to only move according the restrictions associated with that piece. One feature of the invention is that the game rules and pieces essentially correspond to the traditional chess rules, and variations are introduced only as necessary to achieve the purposes of the invention. Each piece is also given a nominal power ranking which has no impact on who wins a match, except to provide a helpful way to determine who currently holds an advantage during the match. Simply adding up the sum of the value of your pieces and that of your opponent's will indicate which side has a nominal power advantage Advanced moves exist as in traditional chess. Castling and En Passant are two examples. Castling allows a participant to move the King and the Rook simultaneously. This move is allowed only if the King is not in "Check" and neither the rook or the King have yet been moved, and the King does not move past any squares that are in the line of fire and threatened by an opponent's piece. However, this may not be readily apparent from the position since the pieces are concealed, the warning that an en passant or a castling move may be a rule requirement, or may be a trap that cause one side to lose automatically based on an unanticipated "illegal" move.

In one embodiment of the invention, when a game piece is captured according to the rules of chess the captured game piece within its shell may remain, at the option of the player who has captured that piece, as an inactive piece on the square on which it was captured. This is referred to herein as the "hold and secure" feature, as the captured square can no longer be used by the opposing player to pass through or land on. In one embodiment, the "hold and secure" square may be held for only two, or a predetermined and designated, numbers of turns, or until recaptured. The length of time that the square is held can be determined by the players or by the rules of a specific training phase they are in, as will be explained below. Ideally, only two or more squares may be held and secured within one match or at any one time. This number may also be determined by the players at commencement of the game or by the rules of a particular phase. A player should make the decision to occupy a "hold and secure" square strategically. Once a player decides to "hold and secure" a square, the player should make this announcement and then may place the shell of the captured piece on its side, thereby representing a hold and captured square. Other alternatives are possible, for example, a coin or other placeholder, with an appropriate indication, may indicate whose square is being held and secured.

Referring now to FIGS. 12 and 13, a black game piece in a black shell 142 is captured and the white player's game piece (here a white Bishop 45) remains on the square. To signify that this is a hold and capture square, the shell 142 is and is thenceforth designated as shell 142S (FIG. 13). The player may place the shell concealing the black player's piece rotated and placed on its side, or upside down, as appropriate, or otherwise indicate by use of an alternative placeholder in some manner, that the square is captured and is to be a held and secured square for the number of moves required or agreed to, unless recaptured.

In FIG. 13, neither the black King 146 (FIG. 12 not visible in FIG. 13), nor indeed any of the black pieces, can move forward due to the "hold and secure" feature in E7. On the other hand, the white piece, that is bishop 45, that has captured the black piece in the shell 142S is free to move anywhere else on the board, leaving the shell 142S, or other appropriate placeholder on the square E7 for the remainder of the game or for the number of turns designated by the rules or agreement. If the square is held and secured for the duration of the game, an alternative rule may also be instituted that if a capturing piece is on the held and secured square, and is in the next turn captured by the opposing player, then the "hold and secure" feature is no longer in effect. Alternatively, a rule can be instituted that the "hold and secure" square may only be recaptured if an opponent's piece is on the square.

The object of the game in this invention is the same as in traditional chess. To win the game, the first player to capture or "Checkmate" an opposing player's predetermined game piece, usually the King is the victor. Thus, a participant's goal is put your opponent into "Check" and ultimately into "Checkmate". Putting your opponent into "Check" means that your opponent must move their King or remove itself from "Check," or otherwise it will be captured and the match would be over. Thus, if your opponent has the ability to move the King out of "Check," the player must do so. When putting your opponent into "Check" you must call out "Check" to your opponent to put your opponent on notice. In one embodiment, it is not necessary to advise the opposing player where the "Check" is coming from, just that the King is in Check. When an opponent's King is in "Checkmate", the game is over as the opponent's King has no moves for which they can move without being captured. Any participant can concede defeat at any point in the game if they believe victory is not feasible. During the end phase, if it is determined that no player can win, the match is ruled a draw. After putting an opponent in "Checkmate", the match is over, as a teaching exercise, each participant may turn the remaining shelled pieces on the board face-up to reveal the positions of the chess pieces.

Participants are under no duty to alert the opponent when their move would produce a game-ending result. Consequently, if a participant makes a fatal move as a result of an error in judgment or inability to remember that the move they are making would result in capture from their opponent, the participant who makes this fatal mistake would lose the match provided the opponent is aware of the capture.

An implied gentleman's agreement that neither side will cheat is always in effect for fear of losing one's honor in doing so. Participants are not allowed to use notations to record and keep track of the movement of the pieces, which would defeat one feature of the training regimen, that incomplete information of the pieces and prior moves of the match, and reliance on memory to follow play, is to provide at least one component of the training. However, a third party or observer may keep notations as in traditional chess or the match can be recorded and reviewed where notations are made to ensure that all moves were valid.

As in traditional chess, if there is a winner, then in the next match held, the winner earns the choice to choose the white pieces and to go first. Alternatively, the white and black pieces are alternated between two players. As described below, once a participant becomes proficient at a phase of the game and wins a clear majority of the matches in the phase, the participant advances to the next phase. Of course, the training program may include other criteria for advancing a player within a phase of training, for example, to a second advanced group of players within that phase, or to the next phase of training, and the most appropriate criteria, or simply an evaluation by the training team, can provide the basis of a determination that a participant in the training program is ready for the next phase.

Other embodiments of the strategy game are inclusion of a temporal element, a change in the way the pieces are set up (not setting the game pieces in the traditional spots of chess on the board), and an addition of a second or more mission component to the game In the embodiment wherein a temporal element is used, the players follow the same rules as the above described invention but with an added time component. Adding a time component, where each side must complete moves within a certain period of time, can also be used as to handicap a recognizably stronger player. Thus, a lesser skilled participant could be given more time to complete a move and the more skilled participant would be given less time. A timed component can be added to any of the variants to create a more stressful decision-making process. The tempo of the match can be used as an advantage. For example, if both sides are allotted 25 seconds to complete a move, then using the full 25 seconds allows your opponent a full 50 seconds of time to help regroup and determine the locations of the pieces on the board and take into account other strategy considerations before their next move. In contrast, if the participant only uses 5 seconds to make a move, then the opponent only has 30 seconds (5 seconds of the participant's time plus 25 seconds allotted for the opponent's move). If a participant is able to establish tempo, then it can provide the momentum of the match to increase the chances of leading to victory.

Another embodiment of the invention is that the game pieces are placed on the horizontal playing surface not following a traditional chess game piece arrangement. The shells provide the ability for the participant to setup their pieces on the two ranks closest to them in any way they want, provided the King is placed somewhere on the rank closest to them (on the first rank). Bishops can be placed on the same color unlike in traditional chess starting positions. In this embodiment, castling is redefined as reverse castling. Reverse castling would allow for the King and Rook to switch places as in regular castling, but where the King starts off in the traditional place of the Rook and the Rook starts off in the traditional place of the King. Since reverse castling is allowed this may have strategic implications on where participants choose to place their King, Rooks and other pieces.

In yet another embodiment of the invention, one side starts off in the traditional chess starting positions, but some or all of their game pieces are exposed. The other side places some or all of their pieces in a non-traditional starting position, but the game pieces are concealed by the shells, except for the King. As a result, the participant who starts off in the traditional starting position with exposed game pieces is at a disadvantage because one player has more information than does the other. To compensate for this disadvantage, one of the game pieces in the shells can be removed. This can be done by the opponent using random selection without knowledge of which one they are choosing, or the removed piece can be selected by choice or by other appropriate method. This feature would tend to more evenly balance the match between players of unequal skill or proficiency in a particular phase. That is, the side with the game pieces in shells still retains the element of surprise; however, they may also lose some "advantage" if a power piece is removed from the board before commencement of the match. If the removal of the game piece is done randomly and is not revealed, all that the participant knows is that one piece was taken off the board and is no longer an asset to their opponent. These features are more analogous to that of a battlefield situation, especially in cases where warring parties are unevenly matched, for example, in cases of asymmetric conflicts, or when engaged unconventional or irregular warfare. On a tactical level, the feature may be used to simulate other incomplete information situations, for example, a missile strike or attack hitting a target, but the intelligence of from whence the attack originated or the identity of what was actually destroyed is not available.

Another embodiment of the invention is directed to the military mindset. Each participant is given a mission that they must complete, before they can capture the King and win the match. The missions can be to capture two of the opponent's power pieces before proceeding to capture the King. These missions are selected through a random draw of the following (Rook, Rook, Knight, Knight, Bishop, Bishop, Queen). Thus, one participant might have selected Bishop, Bishop and have to capture the two Bishops before capturing the King. The other side might have drawn Rook, Queen and have to capture those pieces before proceeding to capture the King. This change requires a new strategy that incorporates defense of power pieces, rather than just protection of the King. To keep the participants in the mode of having incomplete information, the identity of the power pieces that the other side must capture to win the game may be kept concealed as well.

The invention further comprises a feature that is utilizable as a training method for teaching critical decision-making skills and strategy to the participants. The method comprises the steps of determining different levels of capability of a participant and advancing the participant through the levels to achieve proficiency toward the final levels or phases of the training features before completion of the training program.

A first determination of capability is whether a participant can play traditional chess. Once this is determined, the player enters ideally a three, or multiple, phase method for teaching strategy comprising a first phase, a second phase, and an optional third phase, wherein each phase comprises one of the chess variant embodiments indicated above. In order to advance to the next phase, a player must gain proficiency in the earlier phases; after proficiency at one level or phase is gained, that allows the participant to move to the second or subsequent phase. The second phase is necessarily more challenging than the first phase, although it may involve aspects of the first phase. An optional third phase, or even additional phases with increasingly more difficult and rigorous features of one or more of the above described embodiments, is used to increase the stress level, or the time, or other features described above in relation to the different variants. The third phase is more challenging than the second phase and may also involve aspects of the first and second phases.

FIG. 14 shows a flowchart of the inventive training method 400 according to the present invention. In this method, the first step comprises determining the level of chess playing ability 402. The first decision point is "Does trainee know chess?" 404. If "No", Trainee needs to learn to play chess 406. If "Yes", the next step is to launch concealed chess playing program Phase 1 for trainee 408. The trainee undergoes the predetermined training according to the rules and using the features of one or more of the above described embodiments and then is evaluated to see if trainee has achieved proficiency in concealed chess 410. Proficiency may by defined by any of a number of criteria, such as by teaching a certain win rate among other trainees in that phase, as described above. If proficiency is not achieved, and the answer to the query is "No", the participant returns to the phase in which she or he is to learn to play concealed chess 412.

If the answer to the query is "Yes", the next step in the method is to launch concealed chess playing program Phase II, as indicated by identification numeral 414. The next decision point is "Has trainee achieved proficiency in concealed Phase II chess?" 416. If "No", learn to play concealed chess Phase II Variation 418. If "Yes", the next step is launch concealed chess playing program Phase III variation 420. The next decision point is "Has trainee achieve proficiency in concealed Phase III chess?" 422. If "No", learn to play concealed chess Phase III Variation 424. If "Yes", finish 426. Phase III may be optional, or additional steps and phases may be added as needed to make the training method more comprehensive and rigorous. The number of phases, and indeed the number of variants that can be used in the training method, can be variable, as long as the features of the invention are incorporated therein. Among the essential features that should be used in all the training methods are the incomplete information, and the "hold and secure" feature, as each of the variants should attempt to simulate as much as possible true conflict situations.

The level of proficiency of a participant can be determined as result of individual evaluation by the instructors or more objectively by the won loss record under match conditions. To become proficient, a participant should become competent or skilled at each training phase. To do so requires the removal of any opponents' handicap afforded to the participant, as only then can the participant be compared directly with others having a similar skill level. In the objective determination, for example, the number of wins versus the number of losses of the participant may be taken into account before the instructors make a final determination as to whether the participant moves on to the next phase.

FIG. 15 shows a simplified flowchart directed toward the training method 500 of the present invention. The first step is to "Learn to play chess" 502; then "Learn to play concealed chess" 504; followed by "Learn to play Concealed Chess Variation II" 506 and then the last step "Learn to play Concealed Chess Variation III" 508. Again, these are proposed phases and steps in the inventive method, and additional phases or fewer phases may provide for the same benefits to the participants.

The first phase variation for example, may comprise a substantially horizontal playing surface containing a plurality of checker squares as previously disclosed. The game pieces also comprise the game pieces disclosed earlier with each game piece, except the King, being concealable within a housing shell. As disclosed above, one side of the housing shell reveals the game piece facing the first side of the playing surface and the other side of the housing is opaque such that the game piece is not viewable from the second side of the playing surface or opponent's view. The housing shells comprise the same properties mentioned above, wherein they have a base that supports the game piece on the horizontal playing surface. Each King is visible to all players.

The rules are that each player moves each game piece containing the concealed game piece according to traditional chess game rules. The invention also comprises a rule, wherein when a game piece is captured according to the rules of chess and a "hold and secure" placeholder is laid onto the captured square, wherein the captured square can no longer be used by the opposing player to pass through or land either for a predetermined number of moves or the remainder of the game, unless recaptured. This "hold and secure" move can be performed up to two times at the players' discretion. This feature is present in every variant of the training method in at least one of the phases.

One embodiment of the training method of the second phase variation (Phase II) may comprise arranging the chess pieces on the playing surface in non-traditional chess positions.

Another embodiment of the training method of the third phase variation (Phase III) may comprise each player being given a second or more missions to complete before capturing the King is allowed.

Another embodiment of the training method can comprise a temporal feature in one or more of the phases, such that a time limit is instituted for the players to make one move, or a time limit for the total time of the whole match. An example of a temporal feature is that each player must complete the move within a predetermined amount of time, for example, 25 seconds or less.

Yet another embodiment of the concealed feature of the invention is shown in FIG. 16. in this embodiment, the pieces are either dark colored or light colored pieces 320, comprising essentially a six-sided block, which is essentially monolithic, presenting a blank side to the opposing player and having an image of the piece as an etched outline 322 or otherwise drawn on only that side that faces the player whose piece it is.

While certain features of the invention have been illustrated and described herein, many modifications, substitutions, changes and equivalents will now occur to those having skill in the art. These and their equivalents are intended to be included in this description and any and all such modifications and changes as fall within the spirit of the invention are to be considered to be disclosed hereby. For example, the dimensions, size and shape of the various elements may be altered to fit specific applications, or additional steps or phases may be included in the training method. Another variant may be that the openings in the shells are directed away from the player who is playing those pieces and the opening only permits the opposing player to identify the pieces concealed within the shells. Accordingly, the specific embodiments illustrated and described herein are for illustrative purposes only and the invention is not limited except by the following claims.

What is claimed is:

1. A strategy game adapted to enhance a player's skill in critical decision making, memorization and strategy, comprising:
   a) a substantially horizontal playing surface comprising a plurality of checkered squares, and having opposed first and second sides, each side providing a specified placement for a player, and first and second edges extending essentially perpendicularly to the first and second sides, the edges and sides forming a polygon of one set of parallel sides and one set of parallel edges and four substantially right angle corners, one corner each at the intersection of one side and one edge;
   b) a plurality of game pieces associated with each side, including at least one game piece that is designated as the predetermined game piece for one side;
   c) a housing shell for concealing each of the game pieces, with the exception of the predetermined game piece, wherein one side of the housing shell reveals the game piece disposed inside that shell in a predetermined direction, wherein an opening in the housing shell faces the first side of the playing surface and the other side of the housing is opaque such that the game piece disposed inside that housing shell is not viewable from the second side of the playing surface, wherein the housing shell conceals each of the game pieces, and further comprises at least one predetermined game piece being visible to all players; and each housing shell further comprises:
   1. a base that is smaller in surface area than a checkered square on the horizontal surface,
   2. a top cap disposed above said base for concealing a game piece from the top view, and
   3. at least one opaque wall extending essentially vertically from the base to the top cap, and one of the sides comprises a door that can be opened and closed to provide a clear view of the concealed playing piece only to the player on the side of the board toward whom the side with the door faces, said one opaque wall containing an opaque surface that essentially encloses the interior in at least three directions,
   4. an interior platform extending essentially horizontally disposed adjacent the base comprising an attachment means to hold the game piece in place inside said shell, wherein the device is capable of concealing the playing piece within the enclosure of the opaque wall, so that it is not visible from the direction of the opposed edge, and wherein the game pieces have indicators that indicate their playing characteristics, including movement characteristics,
   wherein the game pieces of the player's side disposed inside the shells are placed on the horizontal playing surface by at least one player to provide a concealed game piece.

2. The strategy game according to claim 1, wherein the predetermined game piece is a King, and has a height longer than any of the other game pieces.

3. The strategy game according to claim 1, wherein each housing shell further comprises an interior platform extending essentially horizontally disposed adjacent the base, and said at least one opaque wall essentially encloses on at least three sides the area of the interior platform, wherein the device is capable of concealing the playing piece within the enclosure of the opaque wall so that it is not visible from the direction of the opposing second side and said top conceals the game piece from the top, while simultaneously affording visibility of the game piece enclosed by said housing shell toward a first side of the substantially horizontal playing surface.

4. The strategy game according to claim 1, wherein a hold and secure square indicator is associated with the square when one of the opponent's pieces is captured on a checkered square, thereby obstructing the hold and secured square from being used by the opposing player to pass through or land on, and wherein said hold and secure square can no longer be used by an opposing player for a predetermined number of moves following which predetermined number of moves the hold and secure square becomes available for moving to and therethrough, the indicator indicating a captured square being removed after said predetermined number of moves have been completed.

5. The strategy game according to claim 4, wherein each player is allowed two said hold and secure squares at any one time during a game.

6. The strategy game according to claim 4, wherein said hold and secure square, with the hold and secure square indicator disposed thereon, can no longer be used by an opposing player for the remainder of the game.

7. The strategy game according to claim 6, wherein each player is given a predetermined amount of time to move a game piece to or through checkered squares that do not comprise squares indicated to be held and secured by the hold and secure square indicator.

8. The strategy game according to claim 4, wherein said held and secured square cannot be used by an opposing player for the next two consecutive moves of the game.

9. The strategy game according to claim 8, wherein said opaque wall is a cylindrical wall with an opening facing toward the first side.

10. The strategy game according to claim 9, wherein said opaque wall opening facing toward the first side further comprises a removable cover for closing off said opening.

11. The strategy game according to claim 9, wherein said interior platform includes a temporary attachment and each game piece includes a corresponding temporary attachment, the temporary attachment being chosen from a group consisting of a magnetized discs, hook and loop straps, or restickable adhesive tabs.

12. The strategy game according to claim 1, wherein game pieces are placed on the horizontal playing surface not following a traditional game piece arrangement, with the hold and secure square indicator not indicating any hold and secure squares.

13. The strategy game according to claim 1, wherein a plurality of game pieces of only one player are visible to all players.

14. The strategy game according to claim 1, wherein each player is given a predetermined amount of time to move a game piece to or through checkered squares that do not comprise squares indicated to be held and secured by the hold and secure square indicator.

15. The strategy game according to claim 14, wherein the predetermined amount of time to move a game piece is at most twenty-five seconds.

16. A strategy game adapted to enhance a player's skill in critical decision making, memorization and strategy, comprising:
   a) a substantially horizontal playing surface comprising a plurality of checkered squares, and having opposed first and second sides, each side providing a specified placement for a player, and first and second edges extending essentially perpendicularly to the first and second sides, the edges and sides forming a polygon of one set of parallel sides and one set of parallel edges and four substantially right angle corners, one corner each at the intersection of one side and one edge;
   b) a plurality of game pieces associated with each side, including at least one game piece that is designated as the predetermined game piece for one side;
   c) a housing shell for concealing each of the game pieces, with the exception of the predetermined game piece, wherein one side of the housing shell reveals the game piece disposed inside that shell, wherein an opening in the housing shell faces the first side of the playing surface and the other side of the housing is opaque such that the game piece disposed inside that housing shell is not viewable from the second side of the playing surface, wherein the housing shell for concealing each of the game pieces, and further comprises at least one predetermined game piece being visible to all players, wherein said housing shell for concealing each of the game pieces, with the exception of the predetermined game piece, further comprises:
   a. a base that is smaller in surface area than a checkered square on the horizontal surface,
   b. four sides extending upwardly from said base, said base forming a polygon when viewed from above, and one of the sides comprises a door that can be opened and closed to provide a clear view of the concealed playing piece only to the player on the side of the board toward whom the side with the door faces, said four sides containing an opaque surface that essentially encloses the interior to at least three sides,
   c. a top cap that conceals game piece from the top view, and
   d. an interior platform extending essentially horizontally disposed adjacent the base comprising an attachment means to hold the game piece in place inside said shell,
   wherein the housing shell is capable of concealing the playing piece within the enclosure of the opaque wall, without touching the sides of the playing piece except the bottom, so that it is not visible from the direction of the opposed edge.

17. The strategy game according to claim 16, wherein said top cap comprises the held and secured square indicator and further is capable of being removed and used as an independent game piece separate of said shell.

* * * * *